(12) United States Patent
Kimura et al.

(10) Patent No.: US 6,195,132 B1
(45) Date of Patent: Feb. 27, 2001

(54) NOISE REDUCTION SIGNAL PROCESSING CIRCUIT AND DISPLAY APPARATUS

(75) Inventors: Katsunobu Kimura, Chigasaki; Takaaki Matono; Haruki Takata, both of Yokohama; Tatsuo Nagata, Fujisawa; Masato Sugiyama; Yasutaka Tsuru, both of Yokohama; Koichi Sudo, Fujisawa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/345,489

(22) Filed: Jul. 1, 1999

(30) Foreign Application Priority Data

Jul. 2, 1998 (JP) .................................................. 10-187127

(51) Int. Cl.$^7$ ...................................................... H04N 5/21
(52) U.S. Cl. ........................... 348/618; 348/622; 382/262
(58) Field of Search ................................... 348/618, 622, 348/623; 382/262

(56) References Cited

U.S. PATENT DOCUMENTS 4,885,639 * 12/1989 Nakata et al. ....................... 348/622
5,425,114 * 6/1995 Hamasaki et al. ................... 348/618
5,446,539 * 8/1995 Minakawa ............................ 348/622
5,495,299 * 2/1996 Suzuki et al. ........................ 348/622
5,612,752 * 3/1997 Wischermann ...................... 348/622
5,732,159 * 3/1998 Jung .................................... 382/262
6,097,847 * 8/2000 Inoue .................................. 382/266
6,115,071 * 9/2000 Hurst, Jr. et al. ................... 348/623

* cited by examiner

Primary Examiner—John K. Peng
Assistant Examiner—Trang U. Tran
(74) Attorney, Agent, or Firm—Antonelli, Terry, Stout & Kraus, LLP

(57) ABSTRACT

A noise reduction signal processing apparatus for reducing noises accurately, such as for use in a display apparatus for displaying a video signal, has a median filter (40) which receives the video signal, and which executes a filter processing on the inputted video signal and outputs a reference signal; a subtracter (50) which is connected with the median filter (40), and which outputs a difference signal that indicates a difference between a reference signal outputted from the median filter (40) and the video signal; a minimum value detection circuit (70) which outputs the difference signal from the subtracter (50) or a limitation value, whichever is smaller, as a minimum value signal; and an adder (35) which adds a noise reduction signal obtained on the basis of the minimum value signal output from the minimum value detection circuit (70) and the video signal.

20 Claims, 3 Drawing Sheets

NOISE REDUCTION SIGNAL PROCESSING CIRCUIT AND DISPLAY APPARATUS

BACKGROUND OF THE INVENTION

The present invention relates to a noise reduction signal processing apparatus for reducing noise components included in television video signals; and, more particularly, the invention relates to a noise reduction signal processing apparatus for reducing noises using a median filter.

Conventional techniques used in noise reducing apparatus for reducing noises in video signals using a median filter are disclosed, for example, in "Proposal of a Direct-Current Addition Type Noise Reducer and Development of a MUSE Decoder Dynamic Picture Image Processing Noise Reducer" (Izumi and four others, academic circle magazine of television, Vol. 48, No. 12, pp 1553–1564 (1994); and in the official gazette of Unexamined Published Japanese Patent Application No. 9-163185. This apparatus is referred to as a DC-shifting type NR (Noise Reducer).

Hereunder, a description will be provided concerning the operation and characteristics of the median filter used for such a noise reducing apparatus. This median filter receives input digital video signal data sampled at a desired time and digital video signal data sampled at two points, which are separated from each other in the direction of time according to the desired lengthwise symmetrical or asymmetrical sampling counts. The median filter then outputs video signal data detected at those three different sampling times.

Since the median filter can smooth small amplitude signals more effectively than low-path filters, noises in these output signals can be reduced effectively if small amplitude noise waves are included in those large amplitude video signals. The median filter can therefor pass those large amplitude signals detected at precipitous rising and falling portions without losing such precipitous shapes and timings. Consequently, the signals output from this median filter can be assumed to be ideal original video signals including no noise, whereby those signals are referred to as reference signals.

This noise reducing apparatus compares input signals with the voltage levels of respective reference signals and judges the difference between the voltage level of each input original signal and the voltage level of each reference level, so as to get the noise included input signals close to the reference signals. And, as a result of such judgment, if the voltage level of the input signal is larger than the voltage level of the reference signal, a DC value equivalent to a noise reduction value to be described later is subtracted from the original signal value, thereby obtaining a signal, which becomes a noise-reduced video signal. On the contrary, if the voltage level of the input original signal is smaller than the voltage level of the reference signal, a DC value equivalent to a noise reduction value to be described later is added to the original signal, thereby obtaining a signal, which becomes a noise-reduced video signal. If the voltage level of the original signal is equal to the voltage level of the reference signal, the original signal is output as it is.

The DC value described above is a noise reduction value corresponding to an effective voltage, which is an average level of a noise. This is obtained by detecting a noise component in the synchronizing signal, etc., where there is no video signal, such as in the vertical blanking period, in the input video signals which are original signals, and then integrating the component.

SUMMARY OF THE INVENTION

In such a noise reducing apparatus formed by the conventional techniques described above, the median filter has been used for selecting and controlling a computing method for determining whether to add or subtract the DC value for reducing noises to or from noise included input video signals or to output original signals without performing either of addition and subtraction with respect to the original signals. The DC value equivalent to a noise reduction value is obtained by integrating the voltage level of a noise detected from the synchronizing signal portion at every fixed time whose cycle is sometimes very long with respect to the noise generation cycle and a constant for which the user sets a specific value manually from the outside as the optimal value for reducing noises effectively. In the case of the conventional techniques, a noise reduction value is thus computed for every original signal in the same way.

Consequently, a fixed noise reduction value is always found regardless of the signal level difference between the original and reference signals. For Example, if a noise reduction level is set and computed for a large signal level difference between original and reference signals, an excessive value is added/subtracted to/from the original signal at a less signal level difference section. This will thus separate the object signal farther from the original signal. And, this results in the addition of a new distortion signal to the original signal. In this case, a new noise waveform is added to the original signal, causing the picture quality to be degraded.

Addition of such a new distortion signal to the original signal, however, can be avoided if the noise reduction value is set at about one LSB, which is the minimum unit of sampled video digital data. In this case, since the noise is reduced only by one LSB at a section whose level is over one LSB, the noise reduction effect becomes very small.

In the case of the noise reducing apparatus which uses conventional techniques as described above, therefore, the noise reduction value is a DC value (fixed value) and the actual noise level of the video data is not uniform. This is why distortion is added to the original signal through computation of this DC value, which is equivalent to this noise reduction value even when a median filter is used for selecting such an arithmetic operation method as addition, subtraction, etc. The conventional techniques have thus been plagued with a problem in that accurate noise reduction is impossible because the picture quality is degraded, left-over noise remains even after noise reduction processing, and, according, the effect of the noise reduction becomes low.

The present invention has been formulated in consideration of such problems of the conventional techniques. The present invention provides a noise reduction signal processing circuit and display apparatus which can reduce various voltage level noises included in video signals accurately while preventing the addition of a new distortion signal and not allowing any noise to remain in those video signals after noise reduction processing is complete.

The features of the present invention are embodied in the following structure. That is, a noise reduction signal processing circuit is used for a display apparatus for displaying a video signal, comprising: a median filter which receives the video signal and which executes a filter processing on the inputted video signal and outputs a reference signal; a subtracter which is connected with the median filter, and which outputs a difference signal that indicates the difference between reference signal outputted from the median filter and the video signal; a minimum value detection circuit which outputs the difference signal from the subtracter or a limitation value, whichever is smaller, as a minimum value signal; and an adder which adds a noise reduction signal on the basis of the minimum value signal output from the minimum value detection circuit and the video signal.

In addition, the following structure also embodies the features of the present invention. That is, a display apparatus has a noise reduction signal processing circuit, the noise reduction signal processing circuit comprising: an A/D converter which converts an input video signal into a digital video signal; a delay circuit which is connected with the A/D converter, and which delays the digital video signal from the A/D converter; a median filter which is connected with the A/D converter, and which generates a reference signal on the basis of the digital video signal from the A/D converter; a subtracter which is connected with the median filter and the delay circuit, and which outputs a difference signal that indicates the difference between the reference signal output from the median filter and the digital video signal output from the delay circuit; a minimum value detection circuit which outputs the difference signal from the subtracter or a limitation value, whichever is smaller, as a minimum value signal; and an adder which adds a noise reduction signal on the basis of the minimum value signal output from the minimum value detection circuit and the digital video signal output from the delay circuit.

In addition, the following structure also embodies features of the present invention. That is, a display apparatus has a noise reduction signal processing circuit, the noise reduction signal processing circuit comprising: an A/D converter which converts an input video signal into a digital video signal; a delay circuit which is connected with the A/D converter, and which delays the digital video signal from the A/D converter; a median filter which is connected with the A/D converter, and which generates a reference signal on the basis of the digital video signal from the A/D converter; a first subtracter which is connected with the median filter and the delay circuit, and which outputs a difference signal that indicates the difference between the reference signal output from the median filter and the digital video signal output from the delay circuit; a minimum value detection circuit which outputs the difference signal from the first subtracter or a limitation value whichever is smaller as a minimum value signal; a selection circuit having (a) an adder which adds the minimum value signal output from the minimum value detection circuit and the digital video signal output from the delay circuit; (b) a second subtracter which subtracts the minimum value signal output from the minimum value detection circuit and the digital video signal output from the delay circuit; (c) a switch which has a first terminal to which is input the digital video signal output from the delay circuit, a second terminal to which is input the output signal from the adder, and a third terminal to which is input the output signal from the second subtracter, and which selects and outputs one of the signals that is input into the first, second and third terminals; a control circuit which is connected with the first subtracter, and which outputs a control signal for controlling the switch of the selection circuit according to the difference signal from the first subtracter; and a D/A converter which converts the output signal from the selection circuit into an analogue signal.

In case the reference signal is larger than the digital video signal from the delay circuit, the control current outputs the control signal that selects the second terminal; in case the digital video signal from the delay circuit is larger than the reference signal, the control circuit outputs the control signal that selects the third terminal and, in case the reference signal is equal to the digital video signal from the delay circuit, the control circuit outputs the control signal that selects the third terminal.

DETAILED DESCRIPTION OF THE PREFERRED EMBODIMENT

Figure 1:
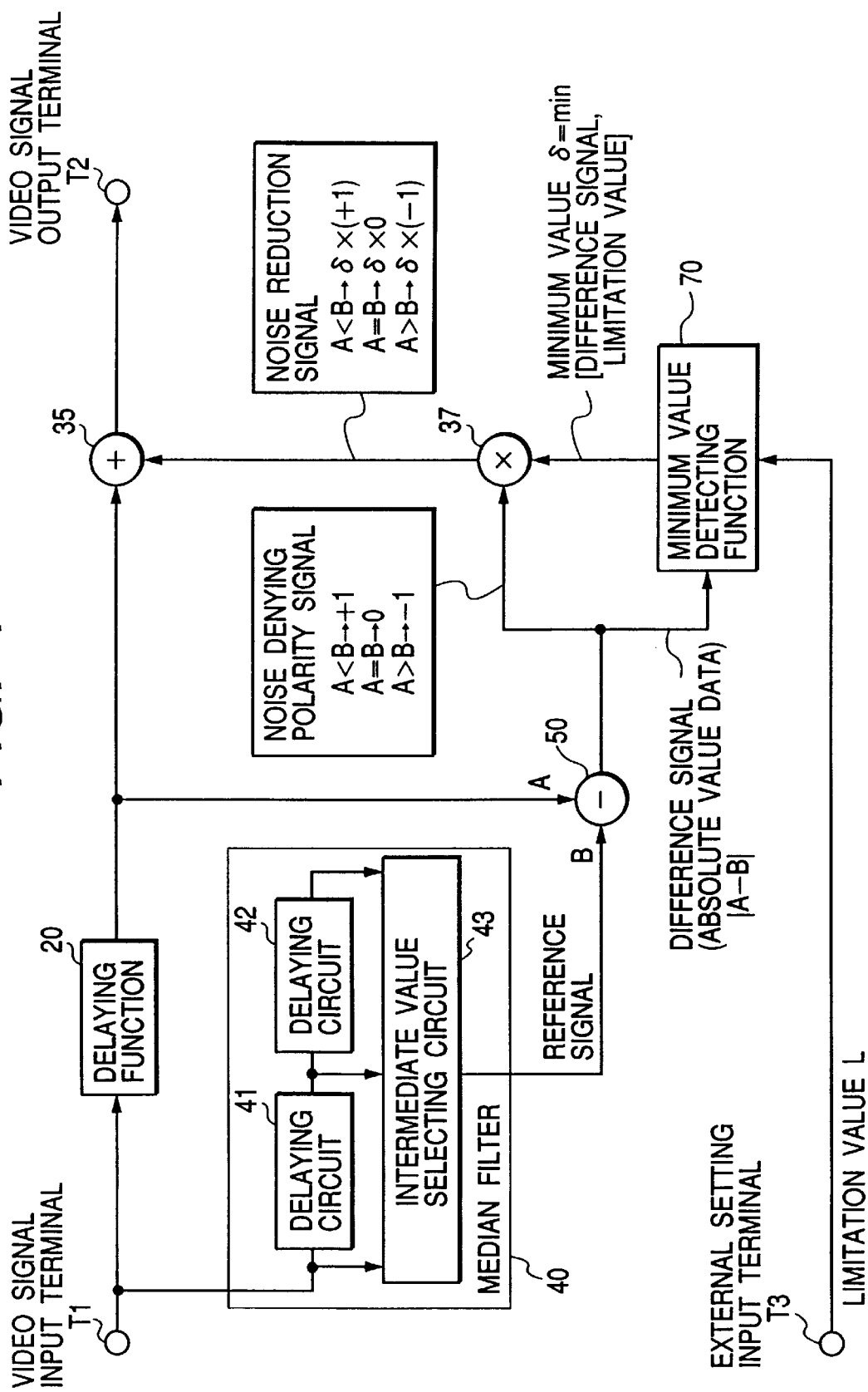
FIG. 1 is a block diagram representing a functional configuration of a noise reduction signal processing circuit according to the present invention.

Hereunder, the functions and configuration of the noise reduction signal processing circuit of the present invention will be described with reference to FIG. 1.

This noise reduction signal processing circuit is generally used as a display apparatus, for example, in a television receiver.

This noise reduction signal processing circuit is provided with a delay function 20, and adding function 35, a multiplying function 37, a filtering function 40, a size judging function 50 composed of an adder, and a minimum value detecting function 70.

The delaying function 20 outputs a delayed video signal (A) obtained by adding a delay, which is equivalent to the output of a median filter 40, to video signals which enter via a video signal input terminal T1. The adding function 35 outputs noise reduced video signals to the video signal output terminal T2. Each of the noise reduced video signals is obtained by adding the delayed video signal (A) output from the delaying function 20 and a noise reduction signal. The multiplying function 37 generates a noise reduction signal by multiplying the minimum value data δ output from the minimum value detecting function 70 by a noise denying polarity signal. The filtering circuit 40 is composed of a median filter, as well as a plurality of delaying circuits 41 and 42 and an intermediate value selecting circuit 43 that are all tandem-connected. This filtering circuit outputs a voltage level intermediate value selected from among the values of the voltage levels of video signals detected at least at three different times, that is, at a time t, before the time t, and after the time t or outputs the most frequently appearing data of the same value selected from among voltage level values of digital video signals detected at least at those three different times t if no intermediate value is found from those voltage levels. The selected intermediate voltage level value or the most-frequently appearing data is output as a reference signal (B). The size judging function 50 compares the delayed video signal (A) with the reference signal (B), thereby judging which of those signals is larger, then outputs the noise denying polarity signal that indicates the direction in which an object noise is reduced. At this time, the function 50 also outputs absolute value data (|A−B|) of a difference signal together with the noise denying polarity signal. The minimum value detecting function 70 outputs L at |A−B|>L, 0 at |A−B|=L, and |A−B| at |A−B|<L as the minimum value data δ, respectively. The values L, O and |A−B| are decided according to the result of comparison between the absolute value data (|A−B|) of a different signal and a limit value (L) entered from an external input terminal T3, respectively.

This configuration of the apparatus of the present invention makes it possible to reduce the noise level using a noise reduction signal obtained by restricting each difference signal at a fixed level. The difference signal is obtained through a comparison between an input video signal and a reference signal obtained via a median filter. Consequently, the above-described apparatus also makes it possible to reduce various voltage level noises included in video signals without adding a new distortion signal (distortion preventive signal) to those video signals, thereby obtaining video signals from which noises are reduced accurately and significantly.

Figure 2:
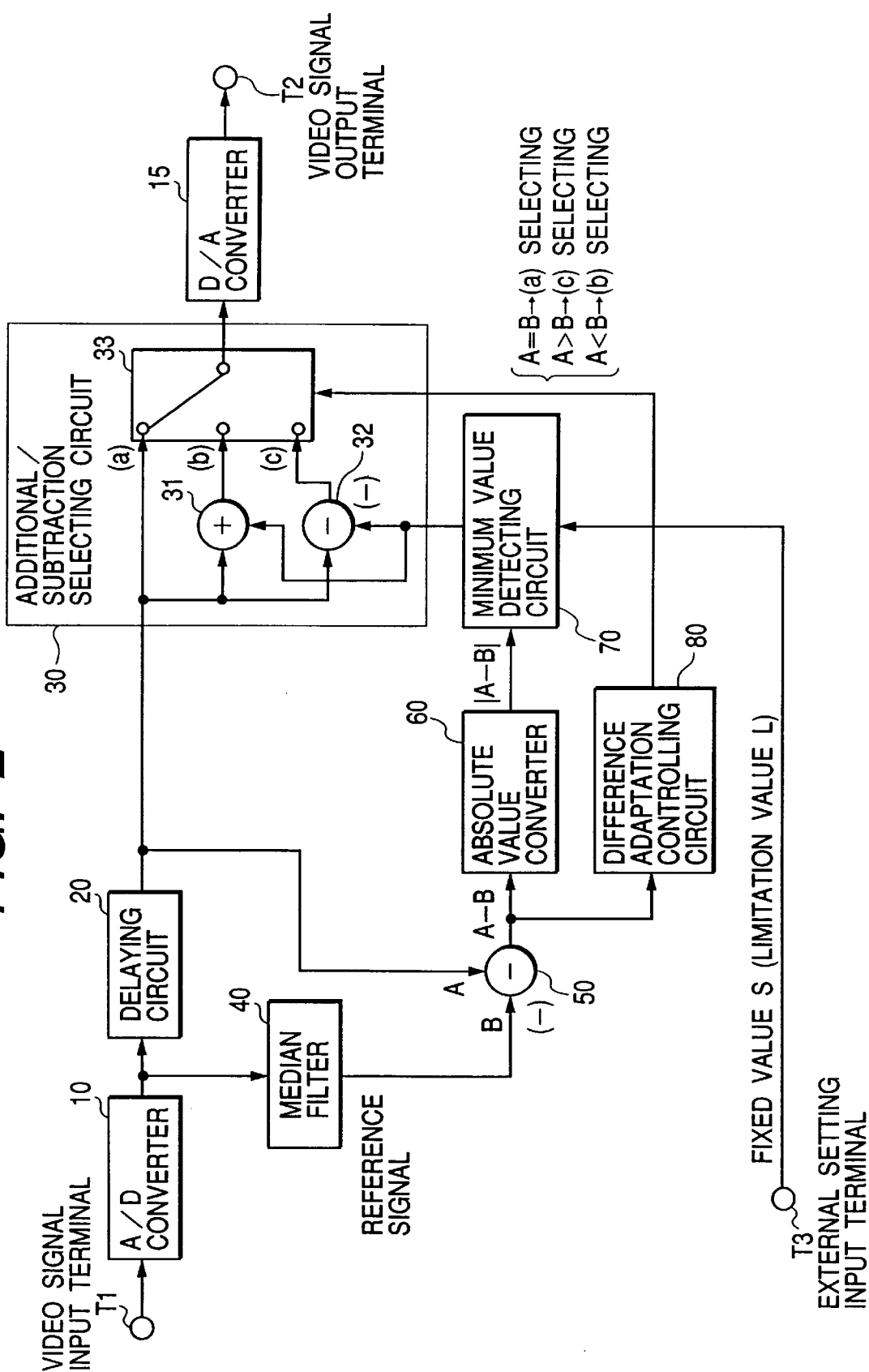
FIG. 2 is a block diagram representing a first example of a noise reduction signal processing circuit according to the present invention.

Next, a first embodiment of the present invention, which implements the noise reduction signal processing descried with reference to FIG. 1, will be described. As shown in FIG. 2, the noise reduction signal processing apparatus of the present invention comprises an A/D converter 10, a delaying circuit 20, an addition/subtraction selecting circuit 30, a D/A converter 15, a median filter 40, a subtracter 50, an absolute value converting circuit 60, a minimum value detecting circuit 70, and a difference adaptation controlling circuit 80. The apparatus further includes a video input terminal T1, a video output terminal T2, and an external input terminal T3. The addition/subtraction selecting circuit 30 comprises an adder 31, a subtracter 32, and a selecting circuit 33.

Hereunder, the operation of the noise reduction signal processing apparatus of the present invention will be described briefly. Video signals supplied via the video input terminal T1 include noises. These video signals are sampled with a predetermined sampling clock in the A/D converter 10 and then are output as digital video signals.

These digital video signal are applied to both the delaying circuit 20 and the median filter 40. In response to each of those video signals, the median filter 40 outputs a voltage level intermediate value selected from among the voltage level values of those video signals detected at least at three different times, that is, at a time t, before the time t, and after the time t or outputs the most frequently appearing data of the voltage levels having the same value, selected from among digital video signals detected at least at those three different times, if no intermediate value is found from those video signals. In such a case, the median filter 40 can smooth small amplitude signals in the high range more effectively than low-path filters. On the other hand, the median filter also outputs large amplitude signals appearing at rising and falling portions so as not to lose their precipitous shapes and timings, thereby those signals can be output as reference signals. Those reference signals can be assembled to be original ideal video signals from which noise elements are already reduced satisfactorily. This selectively output video signal (B) is applied to the subtracter 50.

On the other hand, the video signal applied to the delay circuit 20 is output after it is delayed according to the delay of the video signal in the median filter 40. This delayed and output video signal (A) is supplied to the other input terminal of the subtracter 50. The video signal output from the delay circuit 20 is applied to the input terminal (a) of the selecting circuit 33 of the addition/subtraction selecting circuit 30, as well as to the input terminals of both adder 31 and subtracter 32. The subtracter 50 outputs difference signal data (A−B) obtained by subtracting the reference signal data (B) output from the median filter 40 from the video signal data (A) output from the delay circuit 20. Most of the components of this difference data are noise components, but the difference data will probably include high range components of video signals as well. This difference data also includes positive or negative sign information, since it is a value obtained by subtracting the reference signal from each of noise-included original signals. This difference signal data (A−B) is supplied to both the absolute value converting circuit 60 and the difference adaptation controlling circuit 80, and then it is converted to an absolute value (|A−B|) in the absolute value converting circuit 60 and output as a size of difference data. The absolute value data (|A−B|) of this difference signal is supplied to the minimum value detecting circuit 70.

A limitation value (L) is also supplied to the other input terminal of the minimum value detecting circuit 70 via the external input terminal T3. The limitation value (L) is equivalent to the upper limit value of a noise reduction value. The minimum value detecting circuit 70 compares the absolute value data (|A−B|) of the above difference signal with the limitation value (L), thereby outputting (|A−B|) or (L) whichever is smaller as the minimum value data ($\delta$). More particularly, the minimum value detecting circuit 70 uses a limitation value (L) to limit entered absolute value data (|A−B|). This minimum value data ($\delta$) is applied to the input terminal of the adder 31 and to the other input terminal of the subtracter 32.

The adder 31 outputs the result of addition obtained by adding the video signal (A) output from the delay circuit 20 and the minimum value date ($\delta$) output from the minimum value detecting circuit 70. The result of this addition is supplied to the input terminal (b) of the selecting circuit 33 The subtracter 32 outputs the result of subtraction obtained by subtracting the video signal which is output from the delay circuit 20 from the minimum value data ($\delta$) output from the minimum value detecting circuit 70. The result of this subtraction is supplied to the input terminal (c) of the selecting circuit 33. Each signal supplied to the input terminals (a), (b), and (c) of the selecting circuit 33 is selected and output by the difference adaptation controlling circuit 80 using a selecting method to be described later.

The difference data output from the subtracter 50 is applied to the difference adaptation controlling circuit 80 so as to judge whether the difference data is positive or negative in value, as well as to different whether it is 0 or not. In other words, it is judged whether the value is A>B (positive), A<B (negative), or A=B(0). If the value of the difference data is judged to be 0, that is, when the original signal and the reference signal are judged to have the same value as a result of the judgment, the object portion includes no noise. The difference adaptation controlling circuit 80 thus selects and outputs the original signal supplied to the input terminal (a) of the selecting circuit 33 as it is. If the value of the difference data is positive, the difference adaptation controlling circuit 80 selects the video signals supplied to the input terminal (c) of the selecting circuit 33 and outputs the video signals. More particularly, since the value of positive difference data means that a noise-included video signal, which is an original signal, is larger than the value of the reference signal, the difference adaptation controlling circuit 80 subtracts the difference data, which is equivalent to a noise value, from the original signal, thereby outputting noise reduced video signals. If the value of the difference data is negative, the difference adaptation controlling circuit 80 operates to output the video signal supplied to the input terminal (b) of the selecting circuit 33 and output video signals. More particularly, since the value of negative difference data means that a noise-included video signal, which is an original signal, is smaller than the reference signal value, the difference adaptation controlling circuit 80 adds the difference data, which is equivalent to a noise value, to the original signal, thereby outputting noise reduced video signals.

As described above, the minimum value detecting circuit 70 uses a limitation value (L) received from the terminal T3 to limit the absolute value data (|A−B|) of each different signal. This is because there is some possibility that the difference data also includes high range components of video signals, although most of the difference data consists of noise components. Consequently, if difference data is composed of high range components of an original signal, then a high range component signal, which has a large amplitude level of a video signal, can keep the noise reduction amount of a low level, realized through the arithmetic operation performed by the addition/subtraction selecting circuit 30. The noise reduced digital video signals output from the selecting circuit 33 in such a way are sampled at a predetermined sampling clock in the D/A converter 15, and then they are converted to noise-reduced analog video signals and output from the video output terminal T2.

As described above, according to this example, the median filter 40 can generate the reference signal (B), which is an ideal video signal including almost no high range component signal, and which is almost free of noise components.

The subtracter 50 compares this generated reference signal (B) with the noise20 included input video signal (A), thereby extracting a difference data signal from actual video signals. The difference data signal is a high range component signal, most of which consists of noise components. In addition, since the subtracter 50 judges the difference in size between both signals, the subtracter 50 can also control the selection of an arithmetic operation method of the addition/subtraction selecting circuit 30.

Then, the absolute value converting circuit 60 finds the absolute value of this difference data. The minimum value detecting circuit 70 then limits the difference data converted to an absolute value to the voltage level of the difference data using a limitation value (L) set from the outside.

Consequently, this example makes it possible to include noise components in the difference data obtained from the minimum value detecting circuit 70 by removing high range information components from actual input video signals as much as possible, as well as to limit the noise reduction level freely as needed with the fixed value set from the outside as needed. The addition/subtraction selecting circuit 30 can deny noise components included in input video signals using the difference data generated from actual video signals in such a way.

As described above, according to this example, the level of noise can be reduced using a noise reduction signal obtained by limiting a signal (difference signal) obtained through a comparison between an input video signal and a reference signal supplied through a median filter to a fixed level. Therefore, this example makes it possible to reduce various voltage level noises included in video signals without adding a new distortion signal (distortion preventive signal) to those signals, thereby obtaining accurately and satisfactorily noise-reduced video signals.

Figure 3:
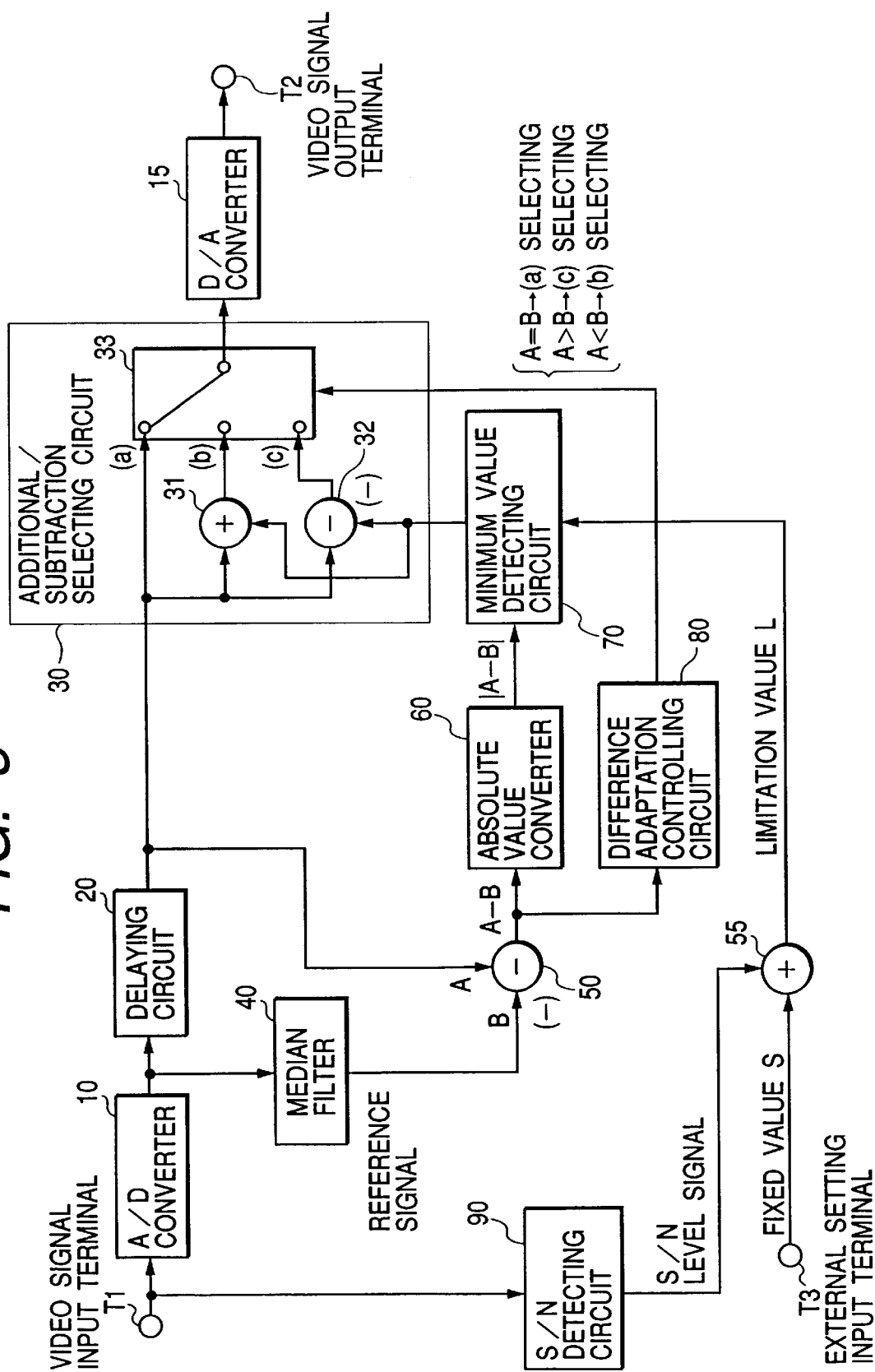
FIG. 3 is a block diagram representing a second example of a noise reduction signal processing circuit according to the present invention.

FIG. 3 is a block diagram of another embodiment of a noise reduction signal processing apparatus according to the present invention. In FIG. 3, the same reference numerals are used for elements having the same functions as those shown in FIG. 2. This example is additionally provided with a S/N detecting circuit 90 and an adder 55. That is the main difference from the embodiment shown in FIG. 2. In this example, the S/N detecting circuit 90 detects video signal noise components from the synchronizing signal, etc. in which no image signal is included during the vertical blanking period of the input video signals, thereby detecting the S/N level.

The S/N detecting circuit 90 outputs a zero S/N level signal when a predetermined S/N level is detected, a minus S/N level signal when the object S/N level is larger than this 0 S/N level, and a plus S/N level signal when the object S/N level is smaller than the 0 S/N level. Furthermore, the S/N level signal output from the S/N detecting circuit 90 is assumed to have a value divided into some steps corresponding to those S/N levels. This value divided into some steps is applied to the adder 55. The other input terminal of the adder 55 receives a fixed value (S), which is equivalent to the upper limit value of a noise reduction value, via the external input terminal T3, as shown in FIG. 3. The adder 55 outputs a limitation value (L), which is smaller than the fixed value (S) set via the external input terminal T3 when the object S/N level is high, that is, when the S/N level is satisfactory, and then outputs a limitation value (L), which is larger than the fixed value (S) set via the external input terminal T3 when the object S/N level is low, that is, when the S/N level is not satisfactory. This limitation signal (L) is supplied to the minimum value detecting circuit 70.

Consequently, according to this example, it is possible to decrease the limitation value (L) according to the S/N level of input video signals, so that the noise reduction is decreased for a favorable S/N level, and to increase the limitation value (L) according to the S/N level of input video signals, so that the noise reduction is increased for an unfavorable S/N level, thereby supplying proper video signals to the minimum value detecting circuit 70. Noises can thus be reduced effectively according to the S/N level of video signals.

As described above, according to this example, it is possible to vary the fixed value (S) set equivalently to a limitation value (L) of the noise reduction value according to an object S/N level. It is thus possible to reduce various voltage level noises included in video signals, thereby to obtain satisfactory noise-reduced video signals without adding a new distortion signal (distortion preventive signal) to those video signals. In this case, it is possible to improve the accuracy of noise reduction more effectively than that of the example shown in FIG. 1.

Although the described embodiments call for the noise reduction signal processing apparatus of the present invention to be used as a single unit, this apparatus can also be used for a television unit. In this case, the effect of the apparatus will appear more significantly.

According to the present invention, the noise reduction processing circuit that uses a median filter is also very effective for noise-contained video signals, so that the circuit makes it possible to obtain video signals from which noises are removed accurately and satisfactorily without adding a new distortion preventive signal to those video signals.

What is claimed is:

1. A noise reduction signal processing circuit for a display apparatus for displaying a video signal, comprising:

a median filter connected to receive a video signal, and which executes a filter processing on the video signal and outputs a reference signal;

a subtracter which is connected with the median filter, and which outputs a difference signal that indicates a difference between a reference signal outputted from the median filter and the video signal;

a minimum value detection circuit coupled to said subtracter and which outputs the difference signal from the subtracter or a limitation value whichever is smaller as a minimum value signal; and an adder which adds a noise reduction signal on the basis of the minimum value signal output from the minimum value detection circuit and the video signal.

2. A noise reduction signal processing circuit in accordance with claim 1, further comprising an A/D converter for converting the video signal that is input into the median filter into a digital signal and the video signal that is input to the subtracter and the adder via delay circuit to a digital signal.

3. A noise reduction signal processing apparatus in accordance with claim 2, wherein the delay circuit delays the digital video signal by a delay amount that is equal with the delay quantity in the median filter.

4. A noise reduction signal processing apparatus in accordance with claim 1, further comprising:

an absolute value conversion circuit which is connected between the minimum value detection circuit and the subtracter, and which supplies an absolute value of the difference signal from the subtracter.

5. A noise reduction signal processing apparatus in accordance with claim 1, wherein the limitation value is a value that represents the upper limit of a noise reduction quantity, and is set from the outside of the apparatus.

6. A noise reduction signal processing apparatus in accordance with claim 1, wherein the limitation value is changed with the S/N level of the input image signal.

7. A noise reduction signal processing apparatus in accordance with claim 1, wherein the noise reduction signal is a signal that adds polarized information according to the difference signal to a minimum value signal output from the minimum value detection circuit.

8. Display apparatus having a noise reduction signal processing circuit, the noise reduction signal processing circuit comprising:

an A/D converter which converts an input video signal into a digital video signal;

a delay circuit which is connected with the A/D converter, and which delays the digital video signal from the A/D converter;

a median filter which is connected with the A/D converter, and which generates a reference signal on the basis of the digital video signal from the A/D converter;

a subtracter which is connected with the median filter and the delay circuit, and which outputs a difference signal that indicates a difference between the reference signal output from the median filter and the digital video signal output from the delay circuit;

a minimum value detection circuit which outputs the difference signal from the subtracter or a limitation value, whichever is smaller, as a minimum value signal; and an adder which adds a noise reduction signal on the basis of the minimum value signal output from the minimum value detection circuit and the digital video signal output from the delay circuit.

9. A display apparatus in accordance with claim 8, wherein the delay circuit delays the digital video signal by a delay amount that is equal with the delay quantity in the median filter.

10. A display apparatus in accordance with claim 8, further comprising:

an absolute value conversion circuit which is connected between the minimum value detection circuit and the subtracter, and which supplies an absolute value of the difference signal from the subtracter.

11. A display apparatus in accordance with claim 8, further comprising:

a S/N ratio detection circuit which detects a S/N of the input video signal, and which outputs a S/N level signal according to the detection S/N value; and a limitation value generation circuit which generates a limitation value by adding the S/N level signal output from the S/N detection circuit and a set value input from the outside.

12. A noise reduction signal processing apparatus in accordance with claim 8, wherein the noise reduction signal is a signal that adds polarized information according to the difference signal to a minimum value signal.

13. Display apparatus having a noise reduction signal processing circuit, the noise reduction signal processing circuit comprising:

an A/D converter which converts an input video signal into a digital video signal;

a delay circuit which is connected with the A/D converter, and which delays the digital video signal from the A/D converter;

a median filter which is connected with the A/D converter, and which generates a reference signal on the basis of the digital video signal from the A/D converter;

a first subtracter which is connected with the median filter and the delay circuit and which outputs a difference signal that indicates a difference between the reference signal output from the median filter and the digital video signal output from the delay circuit;

a minimum value detection circuit which outputs the difference signal from the first subtracter or a limitation value, whichever is smaller, as a minimum value signal;

a selection circuit having (a) an adder which adds the minimum value signal output from the minimum value detection circuit and the digital video signal output from the delay circuit;

(b) a second subtract which subtracts the minimum value signal output from the minimum value detection circuit and the digital video signal output from the delay circuit;

(c) a switch which has a first terminal which receives the digital video signal output from the delay circuit, a second terminal which receives the output signal from the adder; and a third terminal which receives the output signal from the second subtracter, and which selects and outputs one of the signals that is supplied to the first, second and third terminals;

a control circuit which is connected with the first subtracter, and which outputs a control signal for controlling the operation of the selection circuit according to the difference signal from the first subtracter; and a D/A converter which converts the output signal from the selection circuit into an analogue signal.

14. A display apparatus in accordance with claim 13, wherein in case the reference signal is larger than the digital video signal from the delay circuit, the control circuit outputs the control signal that selects the second terminal, in case the digital video signal from the delay circuit is larger than the reference signal, the control circuit outputs the control signal that selects the third terminal, and in case the reference signal is equal the digital video signal from the delay circuit, the control circuit outputs the control signal that selects the third terminal.

15. A display apparatus in accordance with claim 13, wherein the limitation value is a value that represents the upper limit of a noise reduction quantity, and is set from the outside of the apparatus.

16. A display apparatus in accordance with claim 13, further comprising:

a S/N ratio detection circuit which detects a S/N of the input video signal, and which outputs a S/N level signal according to the detection S/N value; and a limitation value generation circuit which generates a limitation value by adding the S/N level signal output from the S/N detection circuit and a set value input from the outside.

17. A noise reduction signal processing circuit for a display apparatus for displaying a video signal, comprising:

median filter means for executing filter processing on an inputted video signal and outputting a reference signal;

subtraction means for outputting a difference signal that indicates a difference between a reference signal outputted from the median filter means and the video signal;

minimum value detection means for outputting the difference signal from the subtraction means or a limitation value whichever is smaller as a minimum value signal; and additional means for adding a noise reduction signal obtained on the basis of the minimum value signal output from the minimum value detection means and the video signal.

18. Display apparatus having a noise reduction signal processing circuit, the noise reduction signal processing circuit comprising:

A/D conversion means for converting an input video signal into a digital video signal;

delay means for delaying the digital video signal from the A/D conversion means;

median filter means for generating a reference signal on the basis of the digital video signal from the A/D conversion means;

subtraction means for outputting a difference signal that indicates a difference between the reference signal output from the median filter means and the digital video signal output from the delay means;

minimum value detection means for outputting the difference signal from the subtraction means or a limitation value, whichever is smaller, as a minimum value signal; and addition means for adding a noise reduction signal obtained on the basis of the minimum value signal output from the minimum value detection means and the digital video signal output from the delay means.

19. Display apparatus having a noise reduction signal processing circuit, the noise reduction signal processing circuit comprising:

A/D conversion means for converting an input video signal into a digital video signal;

delay means for delaying the digital video signal from the A/D conversion means;

median filter means for generating a reference signal on the basis of the digital video signal from the A/D conversion means;

first subtraction means for outputting a difference signal that indicates a difference between the reference signal output from the median filter means and the digital video signal output from the delay means;

minimum value detection means for outputting the difference signal from the first subtraction means or a limitation value, whichever is smaller, as a minimum value signal;

selection means having (a) addition means for adding the minimum value signal output from the minimum value detecting means and the digital video signal output from the delay means;

(b) second subtraction means for subtracting the minimum value signal output from the minimum detection means and the digital video signal output from the delay means; and (c) switch means having a first terminal is receives the digital video signal output from the delay means, a second terminal which receives the output signal from the addition means, and a third terminal which receives the output signal from the second subtraction means, for selecting one of the signals received at the first, second and third terminals, and for outputting the selected signal;

control means for outputting a control signal to control the switch means of the selection means according to the difference signal from the first subtraction means; and D/A conversion means for converting the output signal from the selection means into an analogue signal.

20. A display apparatus in accordance with claim 19, wherein in case the reference signal is larger than the digital video signal from the delay means, the control means outputs the control signal that selects the second terminal, in case the digital video signal from the delay means is larger than the reference signal, the control means outputs the control signal that selects the third terminal, and in case the reference signal is equal the digital video signal from the delay means, the control means outputs the control signal that selects the third terminal.

* * * * *